United States Patent [19]
Lim et al.

[11] Patent Number: 5,883,942
[45] Date of Patent: Mar. 16, 1999

[54] VOICE CALLER I.D. APPARATUS

[75] Inventors: Boon-Chen Lim; Yeung-How Lim, both of Taikoosing, Hong Kong

[73] Assignee: Cybiotronics, Ltd., Hong Kong

[21] Appl. No.: 788,508

[22] Filed: Jan. 24, 1997

Related U.S. Application Data

[60] Provisional application No. 60/031,659 Oct. 20, 1996, and 60/037,738 Nov. 21, 1996.

[51] Int. Cl.$^6$ ...................................................... H04M 1/56
[52] U.S. Cl. ............................................ 379/142; 379/359
[58] Field of Search .................................. 379/67, 88, 89, 379/201, 211, 68, 69, 142, 93.17, 354, 93.23, 215, 355, 359, 67.01, 362, 361, 40; 455/415

[56] References Cited

U.S. PATENT DOCUMENTS

| | | | |
|---|---|---|---|
| 4,585,904 | 4/1986 | Mincone et al. | 379/112 |
| 4,751,728 | 6/1988 | Treat | 379/114 |
| 4,782,508 | 11/1988 | Borchering et al. | 379/67 |
| 4,924,496 | 5/1990 | Figa et al. | 379/142 |
| 4,942,598 | 7/1990 | Davis | 379/57 |
| 5,033,076 | 7/1991 | Jones et al. | 379/67 |
| 5,060,255 | 10/1991 | Brown | 379/67 |
| 5,265,145 | 11/1993 | Lim | 379/142 |
| 5,276,731 | 1/1994 | Arbel et al. | 379/68 |
| 5,289,530 | 2/1994 | Reese | 379/88 |
| 5,329,578 | 7/1994 | Brennan et al. | 379/67 |
| 5,398,279 | 3/1995 | Frain | 379/140 |
| 5,422,938 | 6/1995 | Yamanishi | 379/142 |
| 5,475,739 | 12/1995 | Norimatsu | 379/70 |
| 5,521,969 | 5/1996 | Paulus et al. | 379/142 |
| 5,524,140 | 6/1996 | Klausner et al. | 379/67 |
| 5,533,106 | 7/1996 | Blumhardt | 379/142 |
| 5,574,777 | 11/1996 | Lewis | 379/142 |
| 5,613,006 | 3/1997 | Reese | 379/142 |
| 5,619,561 | 4/1997 | Reese | 379/142 |
| 5,625,676 | 4/1997 | Greco et al. | 379/88 |
| 5,625,680 | 4/1997 | Foladare et al. | 379/199 |
| 5,631,951 | 5/1997 | Chen | 379/67 |
| 5,635,269 | 6/1997 | Eisdorfer | 379/215 |
| 5,644,629 | 7/1997 | Chow | 379/142 |
| 5,680,447 | 10/1997 | Diamond | 379/142 |
| 5,742,669 | 4/1998 | Lim | 379/142 |
| 5,754,636 | 5/1998 | Bayless et al. | 379/142 |

*Primary Examiner*—Paul Loomis
*Assistant Examiner*—Rexford N. Barnie
*Attorney, Agent, or Firm*—Townsend and Townsend and Crew LLP

[57] ABSTRACT

A caller-ID device and/or an integrated caller-ID and answering machine device which is configurable 1) to play a pre-recorded announcement for the user when the caller-ID information received over the PSTN corresponds to stored information indicating an important caller; 2) to play a pre-recorded "block-the-blocker" outgoing message for the caller when a blocked-caller-ID code is received; and/or 3) to play a pre-recorded "reject call" outgoing message for the caller when the caller-ID information corresponds to stored information indicated an undesirable caller. Also disclosed are an economical method and apparatus for displaying caller-24 ID information for a call-waiting caller simultaneously with the caller-ID information of a present caller and a method and apparatus for enabling a caller-ID device to selectively dial the last seven digits of a phone number, the area code and the last seven digits, or a "1", the area code, and the last seven digits of a phone number.

4 Claims, 16 Drawing Sheets

VOICE CALLER I.D. APPARATUS

This application claims the benefit of U.S. Provisional Application Ser. No. 60/031,659 filed Oct. 20, 1996; also this application claims the benefit of U.S. Provisional Application No. 60/037,738, filed Nov. 21, 1996, entitled "METHODS AND APPARATUS FOR DISPLAYING CALLER-ID INFORMATION FOR A CALL-WAITING CALLER," having Attorney Docket No. 017406-000710, and the disclosure of which is incorporated by reference.

BACKGROUND OF THE INVENTION

The present invention relates generally to a telephone device for processing caller-ID information. More specifically, the present invention relates to a method and apparatus for processing caller-ID information, a method and apparatus for displaying caller-ID information for a call-waiting caller, and a method and apparatus for dialing a stored phone number from a caller-ID device.

Several telephone companies now offer caller-ID services for telephone users. These services enable a user to identify the name and/or the phone number of the caller before choosing to accept the call. Telephone companies also provide a blocking service for those users who wish to remain anonymous.

Devices for processing the caller-ID information, including block codes, have proliferated as well. Typical devices include information processing circuitry in the device, usually comprising a controller and a memory, to show the caller's name and/or phone number on a suitable display device. Some device are further provided with circuitry from comparing the number of a calling party with stored information, and for classifying the call as either "wanted" or "rejected" based on the stored information. When the call is classified as "wanted," the number is displayed to the user and a ring indication is provided to indicate to the user that a desired call has been received. When the call is classified as "rejected," the number is displayed and the ring indication is disabled. An example of such a device is provided in co-pending U.S. patent application Ser. No. 08/540,532, which is hereby incorporated by reference in its entirety for all purposes.

A caller-ID telephone is also described in U.S. Pat. No. 5,265,145, hereby incorporated by reference in its entirety for all purposes, which includes many of the features described above. In particular, U.S. Pat. No. 5,265,145 describes a caller-ID telephone which compares the caller-ID information to stored information in the telephone device. When there is a match, the telephone displays the caller's name and number on the device. In addition, the device includes circuitry for causing the caller-ID device to spelling or speak the name of the caller for the user. The present invention is a further development of U.S. Pat. No. 5,265,145.

Conventional caller-ID devices have the capability to display caller-ID information for only one incoming caller at a time. This is because the display device employed in the conventional caller-ID device is typically a liquid crystal display (LCD), a light-emitting diode (LED) display, or comparable device, which provides only three rows for the display of caller-ID information to the user. One row is used to display the name of the caller, a second row is used to display the phone number of the caller, and a third row is used to display other information about the caller including, but not limited to, the time and the date.

When a call or conversation is in progress, the display of the conventional caller-ID device shows the caller-ID information for the present caller. When a second incoming call signal is received on the call-waiting line, the conventional caller-ID device erases the caller-ID information related to the present caller and replaces it with the caller-ID information of the call-waiting caller.

Often, the user would like to simultaneously view the caller-ID information for both the present caller and the call-waiting caller. For example, when the user needs to alternate frequently between the two callers (by employing a "flash" key, for example), or when the user engages in a three-way conference call with two callers, it would be preferable if the caller-ID device could display the caller-ID information for both callers at the same time. However the conventional three row display is inadequate for this purpose.

One solution proposed is to add three more rows to the display unit (i.e., six rows in total) so that the complete caller-ID information of both callers could be displayed simultaneously. However, this solution is not economical because the size of the display would generally exceed cost, power, and size considerations for the caller-ID device and would require a doubling of the display driver capability.

The user of the conventional caller-ID device may cause the device to display an entry of the caller-ID information stored therein. In addition, the user may cause the conventional caller-ID device to dial the phone number of the entry by pressing a DIAL key, or equivalent, while the entry is shown in the display. However, the caller-ID device does not know whether to dial the last seven digits of the phone number; the area code plus the last seven digits of the phone number; or a "1", the area code, and the last seven digits of the telephone number. This problem is exacerbated in certain metropolitan areas that include many different area codes.

The conventional technique for addressing this problem is to enable the user to store the area code(s) which should not be dialed in the caller-ID device. Thereafter, when the user displays an entry and presses the DIAL key, or equivalent, the conventional caller-ID device compares the area code of the displayed entry to the area code(s) stored therein. When there is a match, the conventional caller-ID device dials the selected seven-digit phone number without dialing the area code. Typically, the conventional caller-ID device is configured to store only one such area code which should not be dialed; however, some later models have the capability to store up to three such area codes.

The problem with the conventional approach is that, for some areas of the country, the limited storage capacity of the conventional caller-ID device does not accommodate all of the area codes within the local calling area. Moreover, the conventional approach does not address the problem where a "1" must be dialed with the area code and phone number.

SUMMARY OF THE INVENTION

The present invention provides methods and apparatus for overcoming the shortcomings of caller-ID devices in the prior art.

According to a first aspect, the present invention provides a method and apparatus for processing caller-ID information. One embodiment of the first aspect includes a caller-ID device and/or an integrated caller-ID and answering machine device which is configurable 1) to play a pre-recorded announcement for the user when the caller-ID information received over the PSTN corresponds to stored information indicating an important caller; 2) to play a pre-recorded "block-the-blocker" outgoing message for the caller when a blocked-caller-ID code is received; and/or 3)

to play a pre-recorded "reject call" outgoing message for the caller when the caller-ID information corresponds to stored information indicated an undesirable caller, among other capabilities.

Another embodiment of the first aspect includes a method for configuring a caller-ID device to process the caller-ID information of a desired caller; and a method for configuring a caller-ID device to process the caller-ID information of a undesired caller, including a blocked-caller-ID caller.

According to a second aspect, the present invention provides an economical method and apparatus for displaying caller-ID information for a call-waiting caller which overcomes the shortcomings in the prior art. One embodiment of the second aspect includes a novel display panel which includes an additional row for the display of caller-ID information for a call-waiting caller simultaneously with the caller-ID information of a present caller.

Another embodiment of the second aspect includes a novel method for displaying the caller-ID information of a call-waiting caller.

According to a third aspect, the present invention provides a method and apparatus for enabling a caller-ID device to selectively dial the last seven digits of a phone number, the area code and the last seven digits, or a "1", the area code, and the last seven digits.

These and other aspects of the present invention will become apparent to one of ordinary skill in the art by reference to the remaining portions of the specification and the drawings.

DESCRIPTION OF THE PREFERRED EMBODIMENT

Table of Contents
I. CONFIGURATION OF CALLER-ID DEVICE
II. DETAILED OPERATION
  A. Caller-ID Memory Operation
  B. Programming the Caller-ID Device
    1. Important Caller Encoding/Recording
    2. Reject Caller Encoding
    3. Blocked-Caller Encoding
  C. Processing Caller-ID Information
    1. Important Caller Code Processing
    2. Reject Caller Code Processing
    3. Blocked-Caller Code Processing
  D. Displaying Caller-ID Information for Call-Waiting Callers
  E. Dialing Area Codes

I. CONFIGURATION OF CALLER-ID DEVICE

Figure 1:
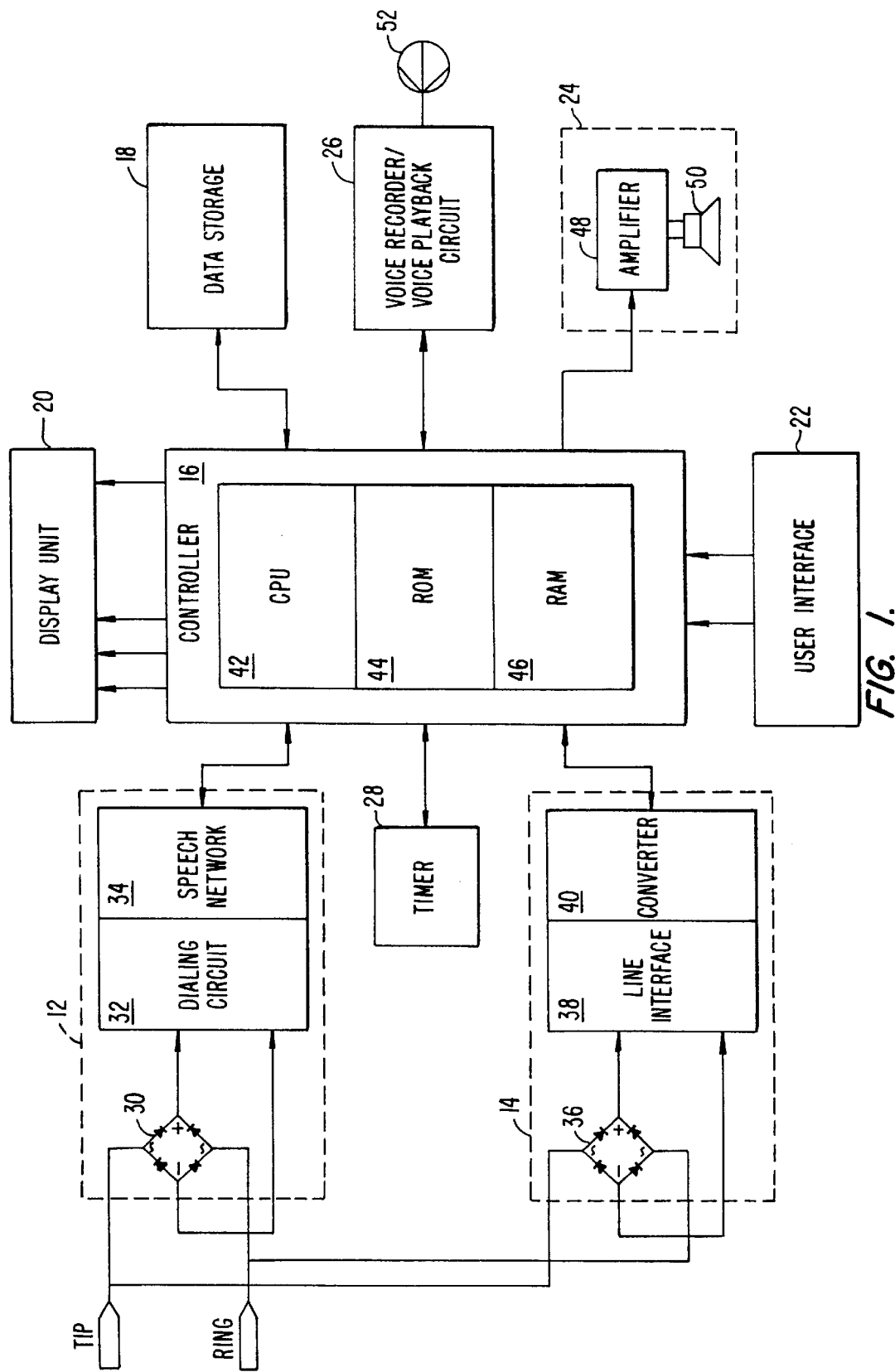
FIG. 1 is a block diagram of an embodiment of a caller-ID device embodying the present invention.

FIG. 1 is a block diagram of a caller-ID device 10 which embodies the present invention. It comprises a line modulation circuit 12 coupled to a controller 16, a line demodulation circuit 14 coupled to controller 16, a data storage unit 18 coupled to controller 16, a display unit 20 coupled to controller 16, a user interface 22 coupled to controller 16, a sound transducer 24 coupled to controller 16, a voice recorder/voice playback circuit 26 coupled to controller 16, and a timer 28 coupled to controller 16.

Line modulation circuit 12 comprises polarity guard 30, dialing circuit 32 and speech network 34. In the preferred embodiment, the input of line modulation circuit 12 is coupled to controller 16 and the output is coupled to the "Tip and Ring" lines of a public switched telephone network (PSTN) (not shown). Line modulation circuit 12 receives data signals at its input and converts them into modulated signals suitable for transmission over the PSTN. The modulation techniques typically employed are frequency-shift keying (FSK) and dual-tone multi-frequency (DTMF) modulation; however, other modulation scheme may also be suitably employed. Dialing circuit 32 and speech network 34 are conventional circuits and, therefore, require no detailed explanation.

Line demodulation circuit 14 comprises polarity guard 36, line interface 38 and convertor 40. The input of line demodulation circuit 14 is coupled to the Tip and Ring lines of PSTN, and the output of line demodulation circuit 14 is coupled to controller 16. Line demodulation circuit converts modulated data received at its input into a serial bit stream of data-carrying pulses recognizable by controller 16. Again, line interface 38 and convertor 40 are conventional circuits. Therefore, they require no detailed explanation.

Controller 16 is a simple commercially available microcontroller. It comprises a central processing unit (CPU) 42, read-only memory (ROM) 44, and random access memory (RAM) 46. RAM 44 and ROM 46 may be integrated with CPU 42 or provided separately as discrete integrated circuits. Controller 16 is coupled to the remaining components of caller-ID device 10 including line modulator 12, line demodulation 14, timer 28, user interface 22, display unit 20, data storage unit 18, voice recorder/voice playback circuit 26, and sound transducer 24.

Controller 16 is configurable to provide the following functions, without limitation: to classify and process caller-ID data received from the PSTN, to store data received from the PSTN or via the user interface into designated areas of data storage unit 18 and to retrieve the same; to perform conventional telephone functions including dialing a phone number stored in memory, to append instruction codes to stored data; to compare received data to stored data; to decode instructions codes appended to stored data, to generate a variety of control signals according to the decoded instruction code(s), and to send information to display unit 20 for display to the user.

Data storage unit 18 is coupled to controller 16 and preferably comprises RAM which may either be combined with RAM 46 in controller 16 or provided as a discrete integrated circuit. In the preferred embodiment, data storage unit 18 is further sub-divided into designated memory areas including, without limitation, a caller-ID memory area, an important-caller memory area, a reject-caller memory area, and an announcement message storage area. In one embodiment of data storage unit 18, each memory area corresponds to a pre-defined range of non-overlapping memory addresses. Alternatively, the size and/or location of the memory areas in data storage unit 18 can vary according to the information stored therein. In this case, a separate table is provided in data storage unit 18 to indicate the starting location of a specified memory area. Each designated area stores data of a specific type according to user-provided information or storage instructions appended to received data.

Display unit 20 receives and decodes instructions from controller 16 to cause information to be displayed for the user. Preferably, display unit 20 is a liquid crystal display (LCD); however, other types of display devices commonly used in commercial electronic devices may also be suitably employed.

User interface 22 is coupled to controller 16 and includes a plurality of keys with which the user interacts to operate caller-ID device 10. In the preferred embodiment, the plurality of keys in user interface 22 includes, without limitation, a mode key (not shown) for selecting one or more operating modes of the caller-ID device, a "MAN RJ" key (not shown) for enabling a user to manually reject a caller shown in display unit 20, a "REC *" key (not shown) for causing the caller-ID device to record an announcement for playback either to the user or to a specified caller,.a "REJ #" key (not shown) for selecting one or more reject-caller modes, a cue key (not shown) and a review key (not shown) for reviewing a list of stored information via display unit 20, and three dial keys (not shown) for initiating a variety of dialing actions by the caller-ID device. The foregoing list is for exemplary purposes only and is not intended to limit the number or type of keys which may suitably be employed in user interface 22.

Sound transducer 24 comprises amplifier 48 and speaker 50. Sound transducer 24 produces a variety of audible signals, including an alert, a ring alarm, and a variety of voice playback signals, according to control signals output from controller 16.

Voice recorder/Voice Playback circuit 26 is coupled to controller 16 and to a microphone 52. In a preferred embodiment, voice recorder/voice playback circuit includes a digital signal processor (DSP) and associated integrated circuits (e.g., an analog-to-digital converter, digital-to-analog converter)(not shown) which are configured to convert electronic signals output by microphone 52 into sound data recognized by controller 16 and storable in data storage unit 18; and to convert sound data stored in data storage unit 18 back into audible sounds suitable for output on sound transducer 24.

Alternatively, voice recorder/voice playback circuit 26 is an analog or digital audio recording device for storing sound data on a medium (not shown) which is independent of data storage unit 18. Suitable independent media includes, without limitation, static RAM, dynamic RAM, asynchronous RAM, and flash memory.

Timer 28 is coupled to controller 16. It is configurable to measure a time period specified by controller 16 operating according to a program. When the specified time expires, timer 28 generates a time-out signal which is output to controller 16.

II. DETAILED OPERATION

A. Caller-ID Memory Operation

When the caller-ID device receives an incoming call, it shows the caller-ID information for the incoming call on display unit 20. In the preferred embodiment, the caller-ID information includes, without limitation, the caller's name, the caller's phone number, the date of the call, and the time of the call. At the same time, the caller-ID device stores the caller-ID information of the incoming call in the caller-ID memory area of data storage unit 18 for later access and review by the user. Typically, the caller-ID memory area of data storage unit 18 includes sufficient memory to store the caller-ID information of a pre-determined number of incoming calls (e.g., 20, 50, or 100). When the caller-ID memory area is full and a new incoming call is received, the caller-ID device replaces the oldest entry in caller-ID memory area with the caller-ID information of the new incoming call. The user reviews the entries stored in the caller-ID memory area of data storage unit 18 by pressing the cue and review keys (not shown) on user interface 22.

B. Programming the Caller-ID Device

1. Important Caller Encoding/Recording

In the preferred embodiment of the present invention, information corresponding to a list of up to 20 important callers may be stored in an important caller memory area of data storage unit 18 of the caller-ID device. The number of important caller that may be stored is not critical and may vary. Each entry of stored important-caller information comprises data representing the name and/or phone numbers of an important caller. The method for inputting important caller information into the caller-ID device will be described in the following paragraphs.

The user designates an important caller by selectively appending an announcement code to a specified entry of the caller-ID memory area. In one embodiment of the present invention, the announcement code is entered into a designated field or memory location adjacent to the desired entry. In another embodiment of the present invention, the announcement code is appended to the specified entry via a linked list (i.e., a pointer is added to the specified entry to indicate the memory location of the announcement code).

In one embodiment of the present invention, the announcement code corresponds to data representing one or more asterisk, "*", symbols. In this case, the user appends an announcement code to a desired entry by pressing the "REC *" key one or more times while the data corresponding to the desired entry is shown in display unit 20. The caller-ID device shows the desired entry in display unit 20 when an incoming call signal from the corresponding caller is received, when the user activates the cue and review keys to scan through the list of entries in the caller-ID memory area, or when the user enters the caller-ID information of the desired caller via an alphanumeric keypad integrated with the caller-ID device. Appending an announcement code to the entry shown in display unit 20 causes the caller-ID device to transfer the name and/or phone number of the desired caller into the important caller memory area of data storage unit 18 along with the appended announcement code.

In the announcement mode, the caller-ID device is configurable to make a specified voice announcement to the user when an incoming call is subsequently received from an important caller. To so configure the caller-ID device, the user presses the "REC *" key once within a predetermined time period while the name and/or number of the desired entry is shown in the display unit 18. After pressing the "REC *" key once within the predetermine time period, the caller-ID device appends a voice announcement code (e.g., "*") to the name and/or phone number of the desired entry and transfers them to the important caller memory area of data storage unit 18. The caller-ID device then indicates that it is being configured to make a specified voice announcement of an important caller by, for example, displaying the following for approximately one second:

REC * [IMPORTANT CALLER NAME],
The period of time for display is not critical and may vary. The caller-ID device next prompts the user to record a voice announcement for the specified important caller by, for example, displaying the following:

"SPK AFTR BEP"
followed shortly thereafter by a conventional "beep" tone. The user then records a preferred voice announcement for the specified caller, such as the name of the caller, which is stored in the voice announcement memory area of data storage unit 18. A pointer is appended to the important caller entry for the specified caller to indicate the location (i.e., address) of the preferred voice announcement for the specified caller. After recording, the caller-ID device replays the recorded voice announcement for verification. If the user is not satisfied with the recorded voice announcement, the user may replace the recorded voice announcement with a new recording by repeating the process described above.

In the announcement mode, the caller-ID device is also configurable to playback a specialized outgoing greeting when an incoming call is received from an important caller. To so configure the caller-ID device, the user presses the "REC *" key two times within a predetermined time period while the name and/or number of the specified important caller is shown in the display unit 20. After pressing the "REC *" key twice within the predetermine time period, the caller-ID device appends an outgoing-greeting code (e.g., "") to the name and/or phone number of the desired entry and transfers them to the important caller memory area of data storage unit 18**. The caller-ID device then indicates that it is being configured to output a specialized outgoing greeting to an important caller by, for example, displaying the following for approximately one second:

REC ** [IMPORTANT CALLER NAME],
The time for display is not critical and may vary. The caller-ID device next prompts the user to record a specialized outgoing greeting for the specified important caller by, for example, displaying the following:

"SPK AFTR BEP"
followed shortly thereafter by a conventional "beep" tone. The user then records a specialized outgoing greeting for the specified caller, for example, "Hi, Mary, the time for our meeting tonight is 7:30 PM instead of 6:30 PM." The specialized outgoing greeting is stored in data storage unit 18 in, for example, an outgoing-greeting memory area. In this case, a pointer is appended to the important caller entry for the specified caller indicating the location (i.e., address) of the specialized greeting for the specified caller. After recording, the caller-ID device replays the recorded outgoing greeting for verification. If the user is not satisfied with the recorded outgoing greeting, the user may replace it with a new recording by repeating the process described above.

If the user configures the caller-ID device to make a voice announcement to the user of an important caller (i.e., by appending a voice announcement code "*" to the desired caller information) and thereafter also configures the device to playback a specialized greeting for that same caller (i.e., by appending an outgoing-greeting code "**" to the desired caller-information), then the caller-ID device will both make an announcement to the user and playback a specialized outgoing greeting when an incoming call signal is received from an important caller.

2. Reject Caller Encoding

In the preferred embodiment of the present invention, information corresponding to a list of up to 12 reject callers (i.e., undesired callers) may be stored in the reject-caller memory area data storage unit 18 of the caller-ID device. Each entry of the reject-caller memory area comprises data representing the name and/or phone numbers of an undesirable caller. The method for storing reject-caller information in the caller-ID device is described in the following paragraphs.

The user designates a reject caller by selectively appending a reject-caller code to a specified entry of the caller-ID memory area. In one embodiment of the present invention, the reject-caller code is entered into a designated field or memory location adjacent to the desired entry. In another embodiment of the present invention, the reject-caller code is appended to the specified entry via a linked list (i.e., a pointer is added to the specified entry to indicate the memory location of the reject-caller code).

In one embodiment of the present invention, the reject-caller code corresponds to data indicating one or more number symbols, "#". In this case, the user appends a reject-caller code to a specified entry by pressing the "REJ #" key one or more times while the data corresponding to the entry is shown in display unit 20. The specified reject caller is shown in display unit 20 when an incoming call signal from that caller is received, when the user activates the cue and review keys to scan through the list of entries in the caller-ID memory area, or when the user enters the caller-ID information of the specified reject-caller via an alphanumeric keypad integrated with caller-ID device. Appending a reject-caller code to the entry shown in display unit 20 causes the caller ID device to transfer the name and/or phone number of the specified reject caller to the reject caller memory area of data storage unit 18 along with the appended reject-caller code.

In the reject-caller mode, the caller-ID device is configurable to deactivate the ring alarm and to reject a call silently when an incoming call is received from a reject caller. To so configure the caller-ID device, the user presses the "REJ #" key once within a predetermined time period while the name and/or number of the specified reject caller is shown in the display unit 20. After pressing the "REJ #" key once within the predetermine time period, the caller-ID device appends a no-message code to (e.g., "#") the name and/or phone number of the specified reject caller and transfers them to the reject caller memory area of data storage unit 18. The caller-ID device then indicates that it is being configured to deactivate the ring alarm and to reject the call silently by, for example, displaying the following for approximately one second:

RJ [REJECT CALLER NAME].
The time period for display is not critical and may vary. The caller-ID device next confirms that the configuration is complete for the specified reject caller by, for example, displaying the word, "COMPLETE" and/or generating a conventional "beep" tone.

In the reject caller mode, the caller-ID device is also configurable to play a pre-recorded outgoing reject message when an incoming call is received from a reject caller. To so configure the caller-ID device, the user presses the "REJ #" key two times within a predetermined time period while the name and/or number of the specified reject caller is shown in the display unit 20. After pressing the "REJ #" key twice within the predetermine time period, the caller-ID device appends a reject-message code (e.g., "##") to the name and/or phone number of the specified entry and transfers them to the reject caller memory area of data storage unit 18. The caller-ID device then indicates that it is being configured to play a pre-recorded outgoing reject message by, for example, displaying the following for approximately one second:

RJ # [REJECT CALLER NAME].

The display time period is not critical and may vary. The caller-ID device next confirms that the configuration is complete for the specified reject caller by, for example, playing the pre-recorded reject message for the user. In the preferred embodiment of the invention, the pre-recorded reject message states, "The number you are calling will not accept the call." The exact wording of the reject message is not critical and may vary.

3. Blocked-Caller Encoding

The caller-ID device is configurable to operate in a reject-blocker mode wherein the caller-ID device rejects incoming calls for which the blocked caller-ID feature has been enabled. In the preferred embodiment of the present invention, the user selects the reject-blocker mode by pressing the mode key (not shown) one or more times until the caller-ID device indicates that it is configured to reject blocked caller-ID calls.

When the reject-blocker mode is enabled, the caller-ID device is configurable to silently reject an incoming call from a blocked-caller. To so configure the caller-ID device, the user presses the "REJ #" key once within a predetermined time period while a blocked call indication is shown in the display unit 20. After pressing the "REJ #" key once within the predetermine time period, the caller-ID device indicates that it is being configured to silently reject the current and all subsequently received blocked-calls by, for example, displaying the following for approximately one second:

RJ BLOCKER.

The caller-ID device next confirms that the configuration is complete by, for example, displaying the word, "COMPLETE" and/or generating a conventional "beep" tone.

When the reject-blocker mode is enabled, the caller-ID device is also configurable to play a pre-recorded outgoing reject message when an incoming call is received from a blocked-caller. To so configure the caller-ID device, the user presses the "REJ #" key two times within a predetermined time period while a blocked call indication is shown in the display unit 20. After pressing the "REJ #" key twice within the predetermine time period, the caller-ID device indicates that it is being configured to play a pre-recorded outgoing reject message for the current and all subsequently received blocked-calls by, for example, displaying the following for approximately one second:

RJ # BLOCKER.

The caller-ID device next confirms that the configuration is complete for the specified reject caller by, for example, playing the pre-recorded reject message for the user.

When the reject-blocker mode is enabled, the caller-ID device is also configurable to play a pre-recorded, outgoing, disable-blocking message when an incoming call is received from a blocked-caller. To so configure the caller-ID device, the user presses the "REJ #" key three times within a predetermined time period while a blocked call indication is shown in the display unit 20. After pressing the "REJ #" key three times within the predetermine time period, the caller-ID device indicates that it is being configured to play a pre-recorded, outgoing, disable-blocking message for the current and all subsequently received blocked-calls by, for example, displaying the following for approximately one second:

RJ ## BLOCKER.

The caller-ID device next confirms that the configuration is complete for the specified reject caller by, for example, playing the pre-recorded, outgoing, disable-blocking message for the user. In the preferred embodiment, the disable-blocking message states, "The number you are calling will not accept blocked calls. Please disable the blocking feature and try again." Other messages conveying the same idea may also be suitably employed.

When the reject-blocker mode is enabled, the caller-ID device is also configurable to enable the user to manually select whether or not to play a pre-recorded outgoing reject message when an incoming call in received for a blocked-caller. To so configure the caller-ID device, the user presses the "REJ #" key four times within a predetermined time period while a blocked call indication is shown in the display unit 20. After pressing the "REJ #" key four times within the predetermine time period, the caller-ID device indicates that it is being configured to enable the user to manually select whether to play a pre-recorded, outgoing, reject message when a blocked-call is received by the caller-ID device by, for example, displaying the following for approximately one second:

RJ ### BLOCKER.

The caller-ID device next confirms that the configuration is complete for the specified reject caller by, displaying the word "COMPLETE" and/or generated a conventional "beep" tone.

C. Processing Caller-ID Information

Figure 2A:
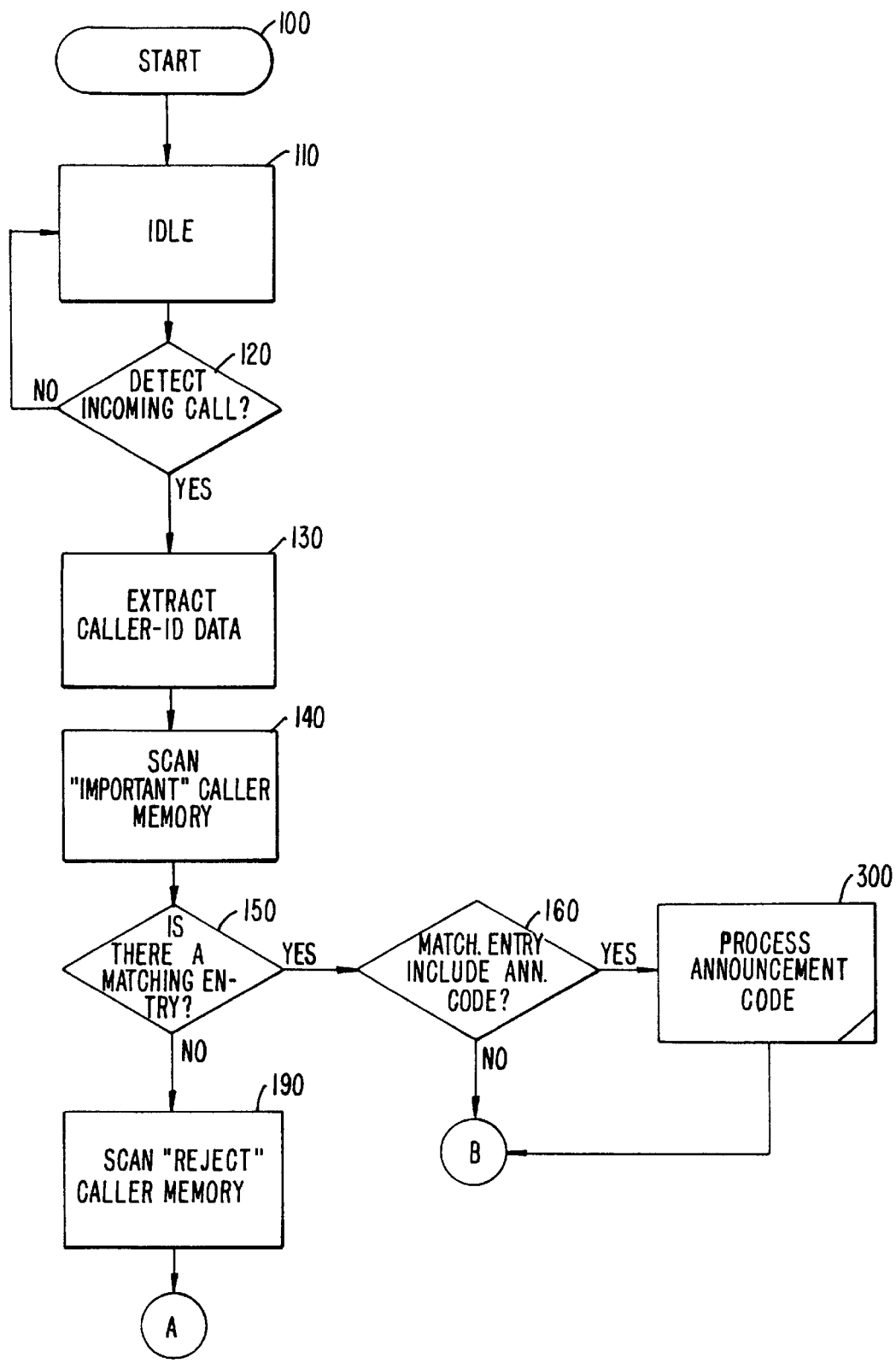
FIGS. 2(a) and 2(b) are a flow-chart representation of an embodiment of a method for processing caller-ID information according to the present invention.
Figure 2B:
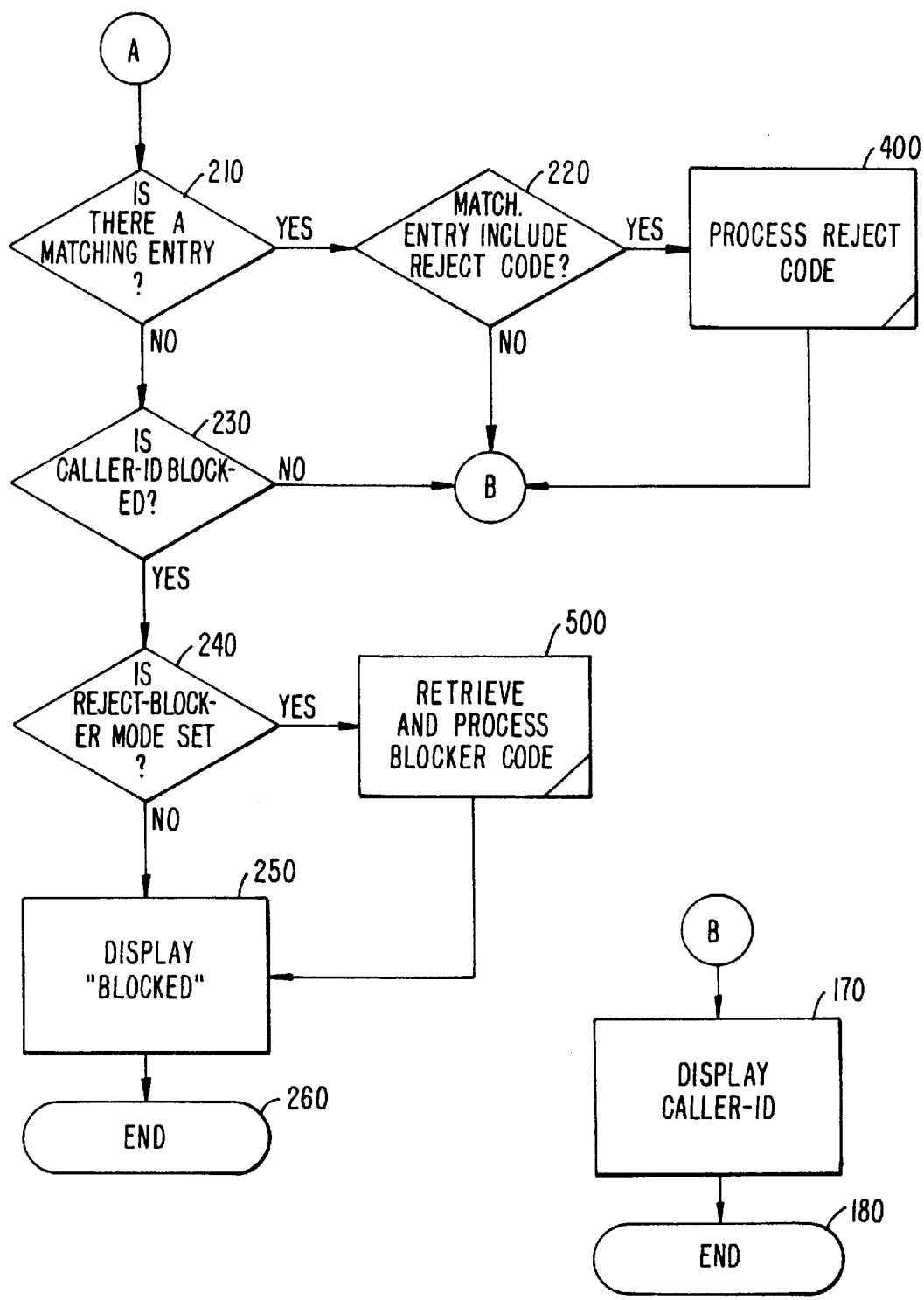

FIGS. 2(*a*) and 2(*b*) are a flow-chart representation of a method for processing a caller-ID signal according to the present invention. The steps which are tagged are expanded in subsequent drawings and described in much greater detail in subsequent sections. A step 100 is an entry point for the method. At a step 110, the caller-ID device is in an idle state reflecting a condition where the caller-ID device is on-hook and no incoming calls are being received by the device. At a step 120, the caller-ID device determines whether an incoming call signal has been detected. If not, than the caller-ID device remains in an idle state by returning to step 110. When incoming data has been detected at step 120, caller-ID device extracts the caller-ID data from the incoming call signal at a step 130.

The caller-ID information extracted at step 130 is then compared to stored important-caller information to determine whether there is a match. In the preferred embodiment of the present invention, this step is performed by scanning the "important" caller memory area at a step 140 and then determining at a step 150 whether any of the phone numbers stored therein match the phone number included in the caller-ID information.

When the caller-ID device determines at step 150 that there is a matching entry in the important-caller memory area (i.e., one of the phone numbers stored in the important-caller memory area matches the phone number included in the caller-ID information), the caller-ID device next determines at a step 160 whether the matching entry includes an announcement code. If the caller-ID device determines at step 160 that the matching entry includes an announcement code, then the caller-ID device processes the announcement code at a step 300. That is, the caller-ID device decodes the announcement code and performs whatever operation is specified by the announcement code. Details of how the caller-ID device processes an announcement code are provided below. If, however, no announcement code is included with the matching entry, then the caller-ID device merely displays the caller-ID information at step 170. A termination point for the method is provided at a step 180.

Referring again to step 150, when the caller-ID device determines at step 150 that there is not a matching entry in the important-caller information, then the received caller-ID information is compared to the reject-caller information to determine whether there is a match. That is, the caller ID device scans the reject-caller memory area at a step 190, and then determines at a step 210 whether there is a matching entry (i.e., one of the phone numbers stored in the reject-caller memory area matches the phone number included in the caller-ID information). The caller-ID device next determines at a step 220 whether the matching entry includes a reject-caller code. If so, then the caller-ID device processes the reject-caller code at a step 400. That is, the caller-ID device decodes the reject-caller code and performs whatever operation is specified by the reject-caller code. Details of how the caller-ID device processes a reject-caller code are provided below in the relevant section. If, however, no reject-caller code is included with the matching entry, then the caller-ID device merely displays the caller-ID information at step 170.

Referring again to step 210, when the caller-ID device determines at step 210 that there is no matching entry in the reject-caller information, then the caller-ID device determines at step 230 whether the caller-ID information corresponds to that of a blocked-caller. If not, then the caller-ID device merely displays the caller-ID information at step 170 as before. If, however, the caller-ID information indicates a blocked-caller, then at a step 240 the caller-ID device determines whether a reject-blocker mode is set in the device. In the preferred embodiment of the present invention, the caller-ID device determines whether a reject-blocker mode is set by interrogating the state of a flag dedicated for that purpose.

If the reject-blocker mode is not set, then the caller-ID device merely indicates to the user at a step 250 that a blocked call has been received by, for example, displaying the word "BLOCKED" at display unit 20. If, on the other hand, the reject-blocker mode is set, then caller-ID device retrieves and processes the blocked-caller code at a step 500. That is, the caller-ID device decodes the blocked-caller code and performs whatever operation is specified by the code. Details of how the caller-ID device processes the blocked-caller code are provided below in the relevant section. A second termination point for the method is provided at step 260.

A detailed description of the tagged components of FIGS. 2(*a*) and 2(*b*) is provided in the following paragraphs.

1. Important Caller Code Processing

Figure 3:
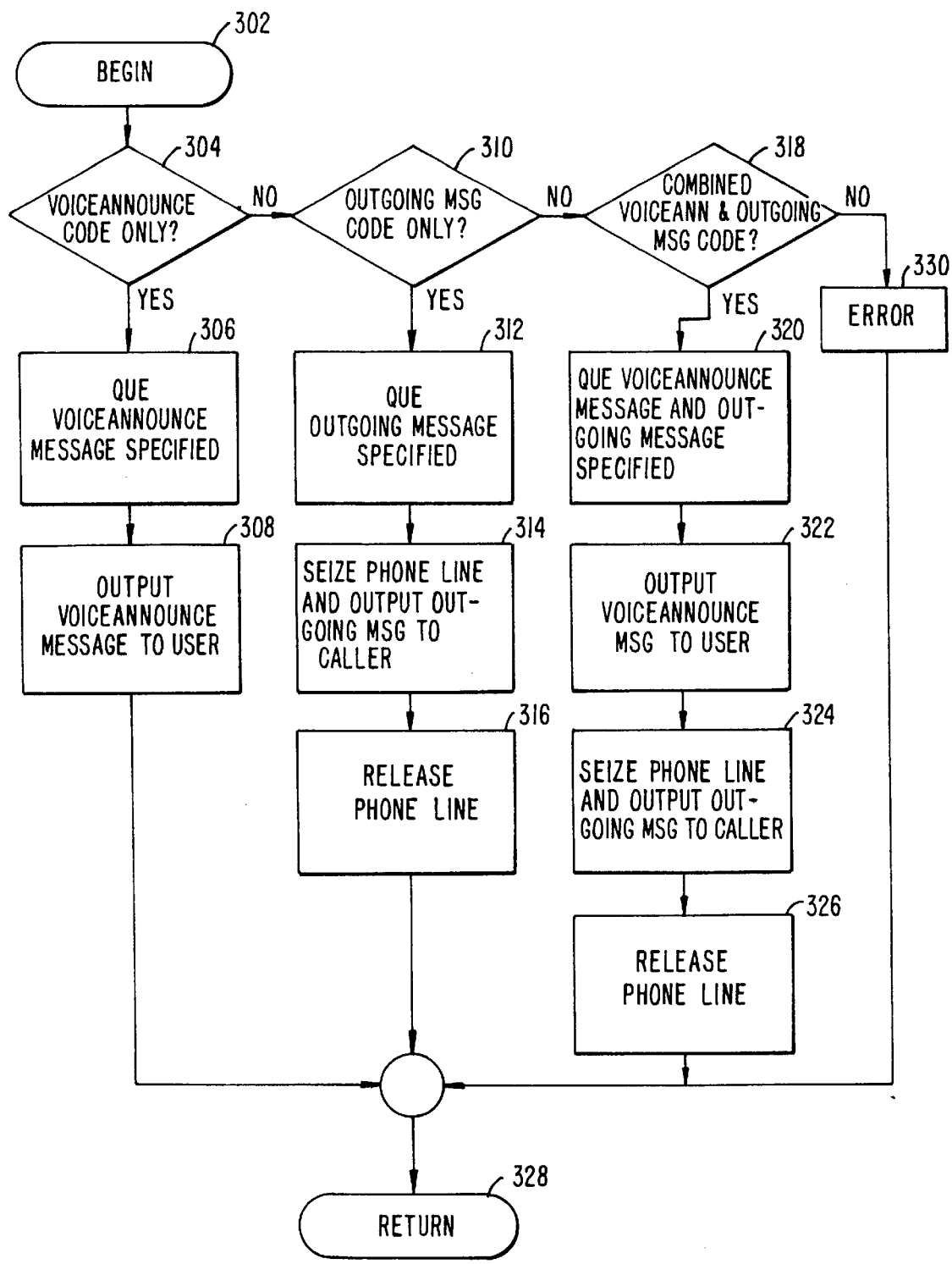
FIG. 3 is a flow-chart representation of an embodiment of a method for processing an announcement code according to the present invention.

FIG. 3 is a flow-chart representation of the method for processing an important caller code according to the present invention. A step 302 provides an entry point for the method. At a step 304, the caller-ID device determines whether the announcement code corresponds to a Voice Announcement Code (i.e., a code which causes the caller-ID device to make a voice announcement to the user when an incoming call is received from an important caller). In the preferred embodiment, a voice announcement code corresponds to data indicating a single asterisk "*". If the announcement code is a voice announcement code, then at a step 306, the caller-ID device queues for playback the voice announcement recorded for the specified important caller. Then, at a step 308, the caller-ID device outputs the specified voice announcement to the user.

If the caller-ID device determines at step 304 that the announcement code does not correspond to a voice announcement code, then the caller-ID device determines at a step 310 whether the announcement code corresponds to an outgoing-message code (i.e., a code which causes the caller-ID device to play a specified outgoing greeting for the important caller). In the preferred embodiment, an outgoing-message code corresponds to data indicating two asterisks, "". If the announcement code is an outgoing-message code, then the caller-ID device at a step 312 queues for playback the outgoing greeting recorded for the specified important caller. The caller-ID device next seizes the phone line at a step 314 and plays the specified outgoing greeting for the caller. After playing the specified message, the caller-ID device releases the phone line at a step 316** and goes back to an on-hook status.

If at the step 310, the caller-ID device determines that the announcement code does not correspond to an outgoing message code, then the caller-ID device at a step 318 determines whether the announcement code corresponds to a combined voice-announcement and outgoing-message code (i.e., for causing the caller-ID device to both make a voice-announcement of an important caller and to play an outgoing greeting for the important caller). In the preferred embodiment of the present invention, a combined voice-announcement and outgoing-message code is represented by data indicating three asterisks, "***", appended to the matching entry (i.e., a combined voice-announcement code, "*", and outgoing-message code, "") . If the announcement code corresponds to a combined voice-announcement and outgoing-message code, then at a step 320, the caller-ID device queues both the announcement recorded for the caller and the specialized outgoing-greeting specified for the caller. At a step 322, the caller-ID device outputs the queued announcement for the user, and at a step 324, it seizes the phone line and plays the queued outgoing greeting for the caller. At a step 326, the caller-ID device releases the phone line and goes on-hook. A step 328** provides an exit point for the method.

If at step 318, the caller-ID device determine that the announcement code does not correspond to a voice-announcement/outgoing-message code, then at a step 330 an error condition is declared.

2. Reject Caller Code Processing

Figure 4:
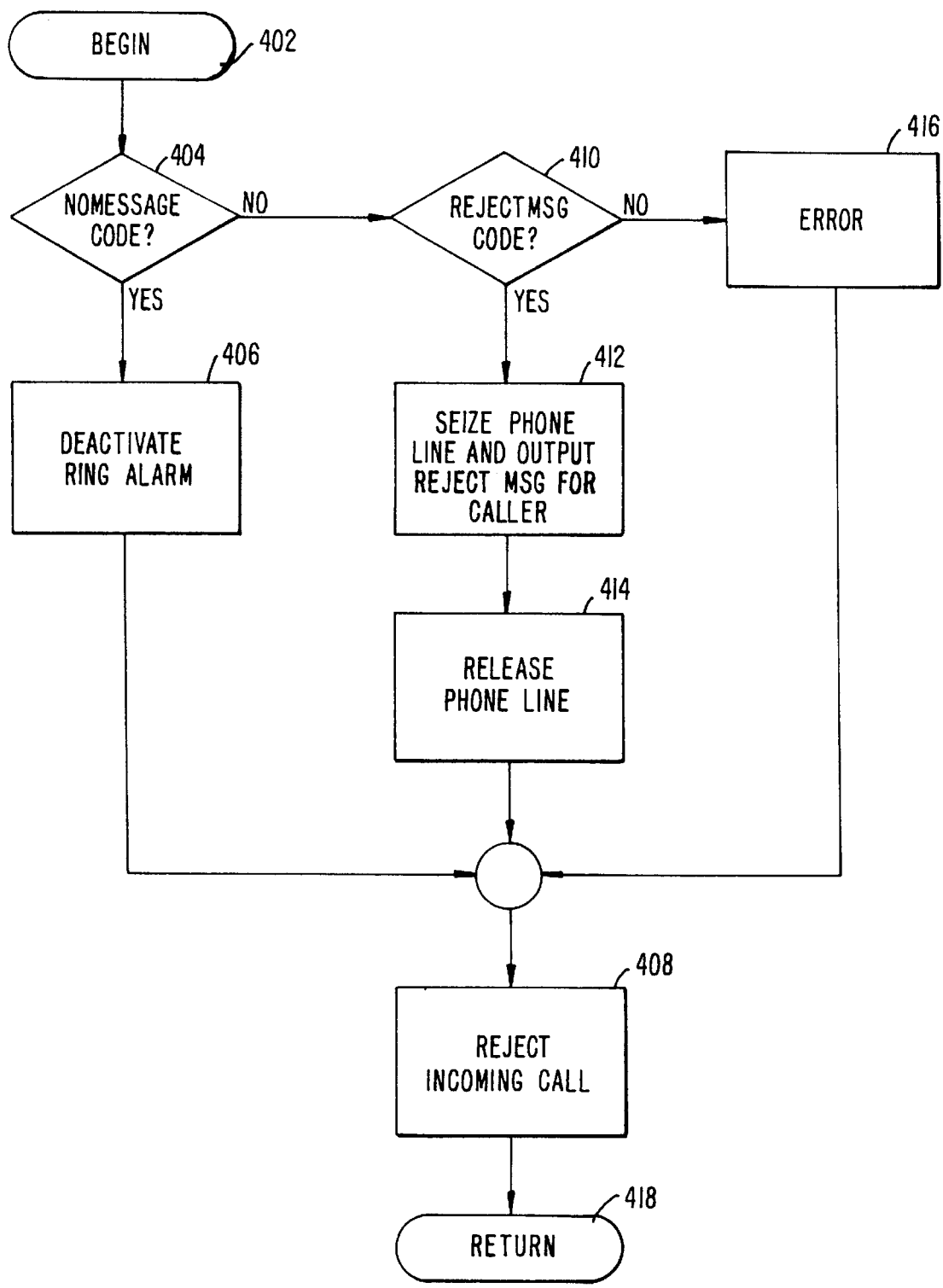
FIG. 4 is a flow-chart representation of an embodiment of a method for processing a reject code according to the present invention.

FIG. 4 is a flow-chart representation of a method for processing a reject-caller code according to the present invention. A step 402 provides and entry point for the method. At a step 402 the caller-ID device determines whether the reject-caller code corresponds to a no-message code (i.e., a code for causing the caller-ID device to deactivate the ring alarm and to silently reject the call) In the preferred embodiment of the present invention, a no-message code is represented by data indicating a "#" appended to a reject-caller entry. If the reject-caller code corresponds to a no-message code, then at a step 406, the caller-ID device deactivates the ring alarm at a step and rejects the incoming call at a step 408.

If, conversely, the caller-ID device determines at step 404 that the reject-caller code does not correspond to a no-message code, then at a step 410 the caller-ID determines whether the reject-caller code corresponds to a reject-message code (i.e., a code for causing the caller-ID device to play a pre-recording reject message for a reject caller). In the preferred embodiment of the present invention, a reject-message code is represented by data indicating two number signs, "##" appended to a reject-caller entry. When the reject-caller code corresponds to a reject-message code, the caller-ID device, at a step 412, seizes the phone line and plays a pre-recorded reject message for the caller. At a step 414, the caller-ID device releases the phone line. Then, at a step 408, the caller-ID device rejects the incoming call.

If at step 410, the caller-ID device determines that the reject-caller code does not correspond to a reject-message code, then at a step 416, the caller-ID device indicates an error condition. A step 418 provides an exit point for the method.

3. Blocked-Caller Code Processing

Figure 5A:
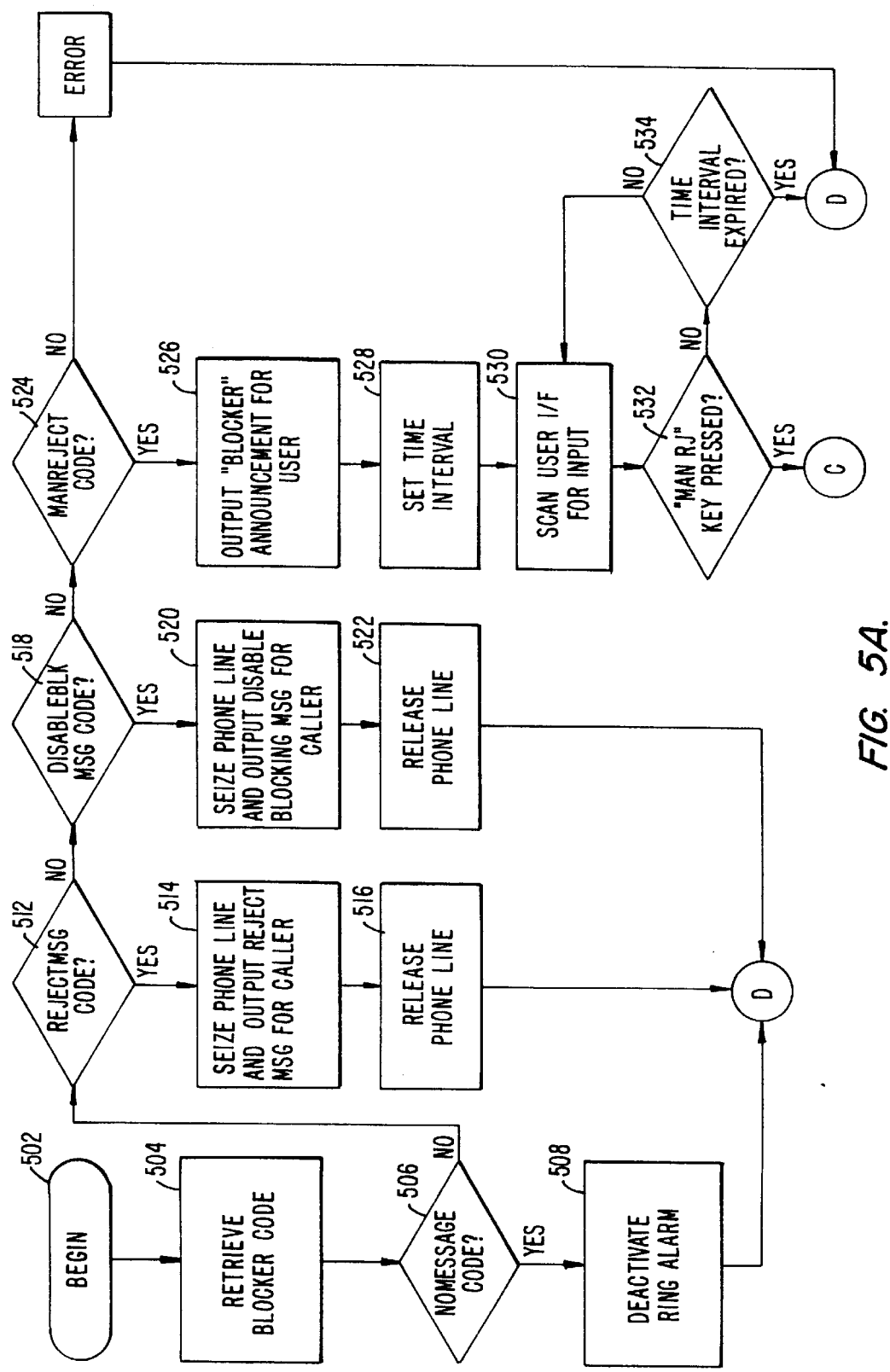
FIGS. 5(a) and 5(b) are a flow-chart representation of an embodiment of a method for retrieving and processing a blocker code according to the present invention.
Figure 5B:
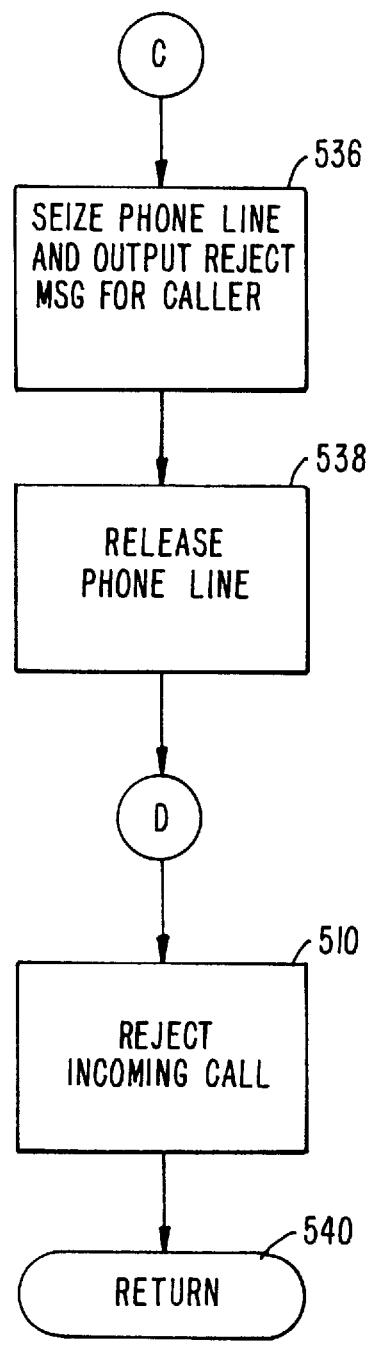

FIGS. 5(a) and 5(b) are a flow-chart representation of a method for retrieving and processing blocked-caller codes according to the present invention. A step 502 is an entry point for the method. At a step 504, the caller-ID device retrieves a blocked-caller code. In the preferred embodiment of the present invention, the blocked-caller code is stored at a memory address specified for that purpose. After retrieving the blocked-caller code, the caller-ID 500 device determines at a step 506 whether the blocked-caller code corresponds to a no-message code. If so, then, at a step 508, the caller-ID device deactivates the ring alarm and, at step 510, rejects the incoming call.

If the caller-ID device determines at step 506 that the blocked-caller code does not correspond to a no-message code, then at a step 512, the caller-ID device determines whether the blocked-caller code corresponds to a reject-message code. When the blocked-caller code corresponds to a reject-message code, the caller-ID device, at a step 514, seizes the phone line and plays a pre-recorded reject message for the caller. At a step 516, the caller-ID device releases the phone line. Then, at a step 510, the caller-ID device rejects the incoming call.

If the caller-ID device determines at a step 512 that the blocked-caller code does not correspond to an reject-message code, then at a step 518, the caller-ID device determines whether the blocked-caller code corresponds to a disable-blocking code (i.e., a code for causing the caller-ID device to play a message requesting that the caller disable the blocked-caller-ID feature and try again). When the reject-caller code corresponds to a disable-blocking code, the caller-ID device, at a step 520, seizes the phone line and plays a pre-recorded disable-blocking message for the caller. At a step 522, the caller-ID device releases the phone line. Then, at a step 510, the caller-ID device rejects the incoming call.

If at step 518 the caller-ID device determines that the blocked-caller code does not correspond to a disable-blocking code, then at step 524, the caller-ID device determines whether the blocked-caller code corresponds to a manual-reject code (i.e., a code for putting the caller-ID device in a manual-reject mode). If the blocked-caller code corresponds to a manual-reject code, then, at a step 526, the caller-ID device indicates to the user that a blocked-call has been received by, for example, playing a pre-recorded "blocker" announcement for the user.

Next, the caller-ID device sets a time interval at a step 528. During the time interval the caller-ID device scans the user interface at a step 530, and determine, at a step 532, whether or not a "Man RJ" key has been pressed during the time interval. If the "Man RJ" key has not been pressed, then at a step 534 the caller-ID device determines whether the time interval has expired. If the time interval has expired, then the caller-ID device rejects the incoming call at a step 510. If, on the other hand, the time interval has not expired, then the caller-ID device returns to step 530 and scans the user interface again to determine whether the "Man RJ" key has been pressed.

If the "Man RJ" key has been pressed, then processing proceeds to a step 536 where the caller-ID device seizes the phone line and outputs a pre-recorded reject message to the caller. After completing playback of the pre-recorded reject message, the caller-ID device releases the phone line at a step 538 and rejects the incoming call at step 510. A step 540 provides an exit point for the method.

D. Displaying Caller-ID Information for Call-Waiting Callers

Figure 6:
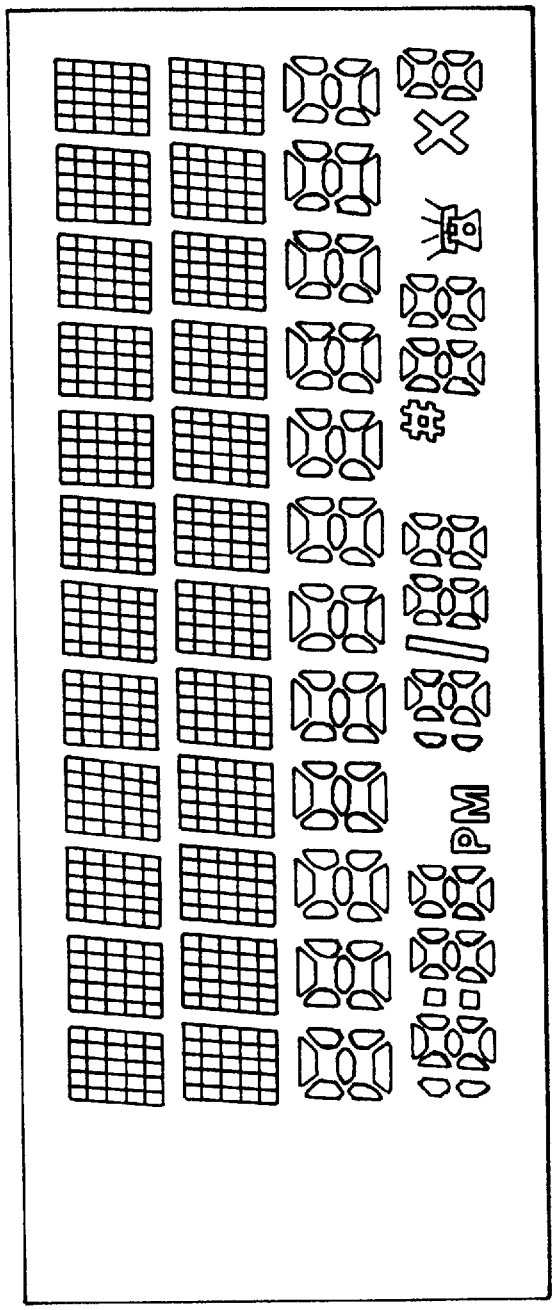
FIG. 6 is a representation of a first embodiment of a novel display panel according to the present invention.

Referring to FIG. 6, there is shown one embodiment of a novel display panel for use in display 20 unit according to the present invention. It includes four rows/lines for the display of caller-ID information. When only one incoming call is being processed, the caller-ID device shows the complete caller-ID information for the caller in three of the four rows of the display panel such as, for example, the second, third and fourth rows of the display panel (with respect to the top of the device). The information displayed includes, without limitation, the name of the caller, the phone number of the caller, and other information about the caller, such as the time and date of the call.

When a second call is received on the call-waiting line, the caller-ID device re-displays the caller-ID information for the present caller in a summary form by, for example, shifting the name and/or phone number of the present caller to one row/line of the display panel 50, such as the first row. The caller-ID device then shows the complete caller-ID information of the call-waiting caller in the remaining three rows of the display panel 50.

Figure 7:
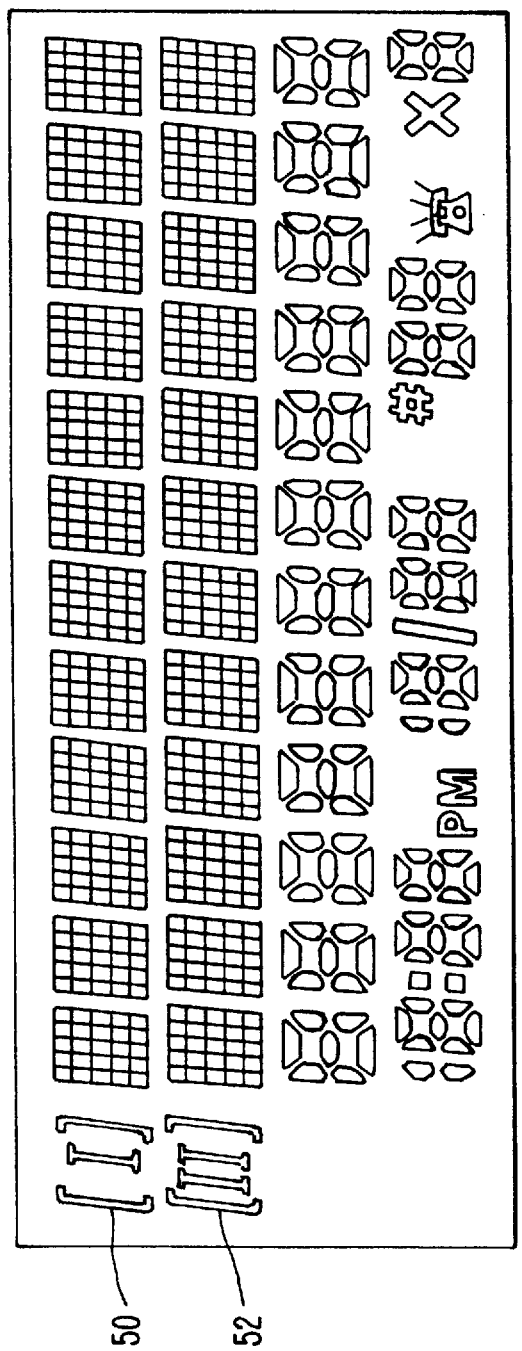
FIG. 7 is a representation of a first variation of a second embodiment of a novel display panel according to the present invention.
Figure 8:
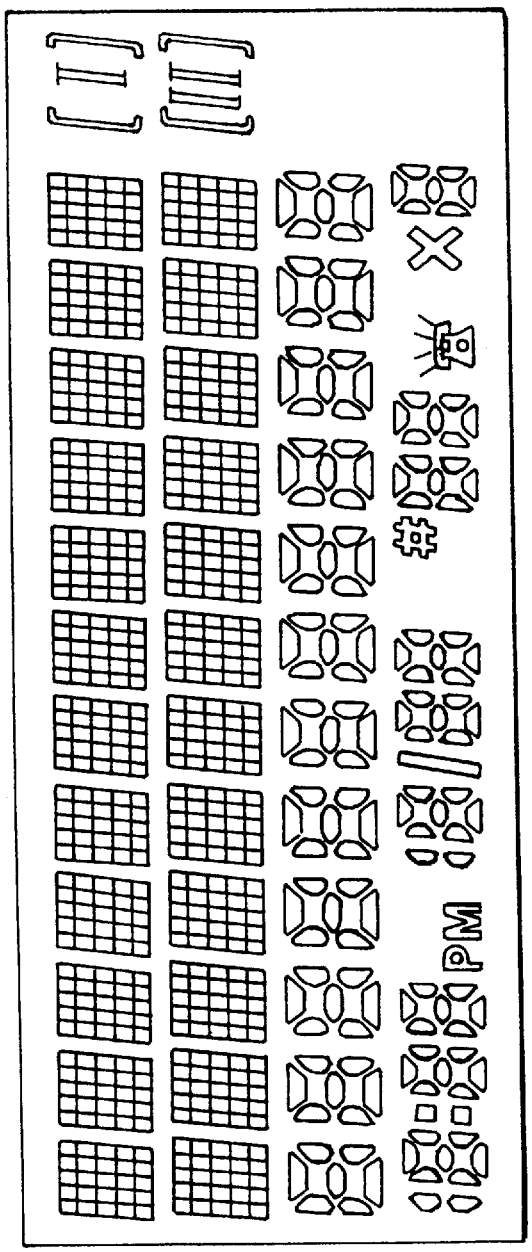
FIG. 8 is a representation of a second variation of a second embodiment of a novel display panel according to the present invention.

Referring to FIGS. 7 and 8, there is shown a second embodiment of a novel display panel according to the present invention. Sequence indicators 50 and 52 for indicating an order of the present and the call-waiting callers are included in the display panel adjacent to the first and second rows/lines of the display unit. In the figures, the sequence indicators appear as the numbers "1" and "2" in Roman numeral form.

Figure 9:
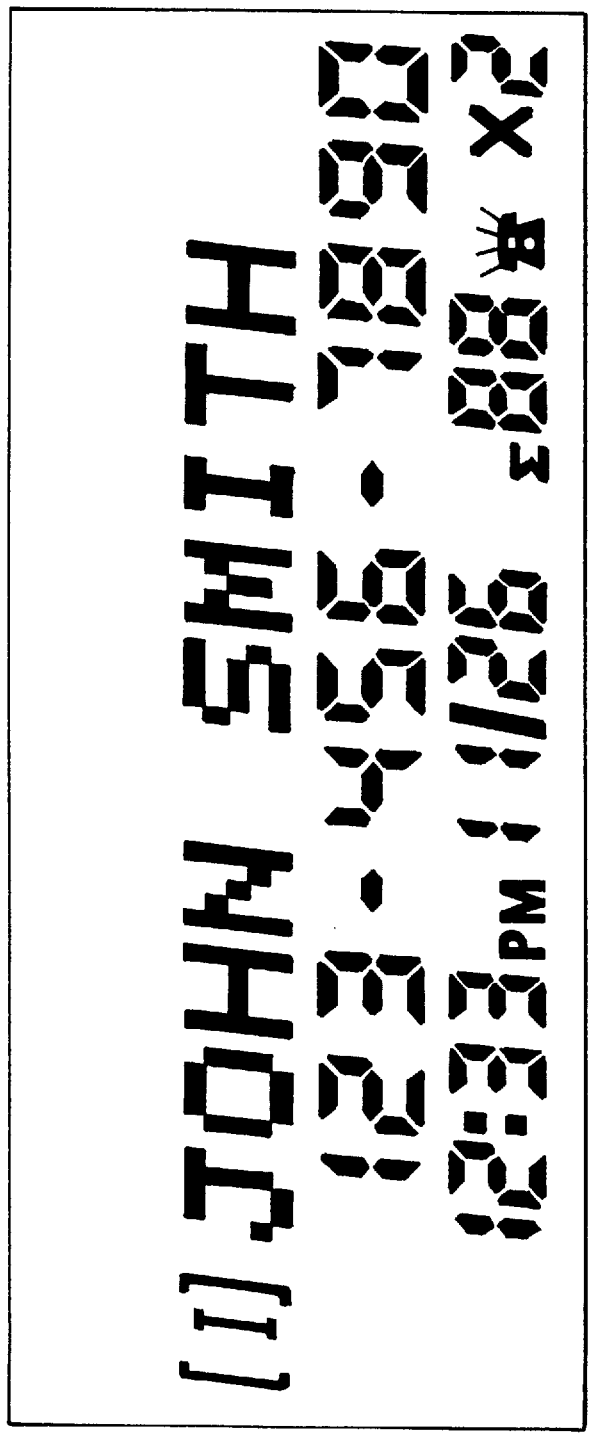
FIG. 9 is an illustration of representative data for one caller being output on the display panel of FIG. 7.

In FIGS. 7 and 8, sequence indicator 52 adjacent to the second row of the display unit is variable to indicate either a "1" or a "2". Referring to FIG. 9, there is shown representative data output on the display panel of FIG. 7 for only one caller, John Smith. In this case, the caller-ID device illuminates the sequence indicator 52 adjacent to the second row to indicate a "1", thereby conveying to the user that the caller-ID information shown corresponds to the one caller, the first caller.

Figure 10:
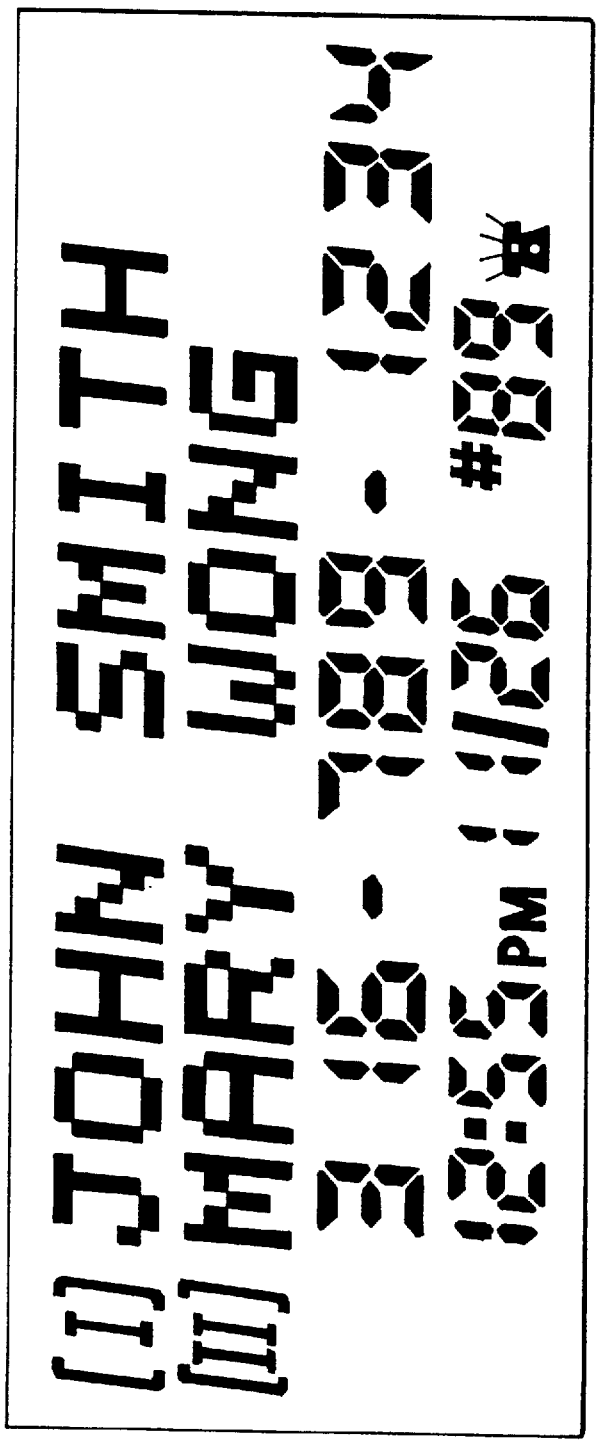
FIG. 10 is an illustration of representative data for two callers being output on the display panel of FIG. 7.

Referring to FIG. 10, there is shown representative data output on the display panel of FIG. 7 for a first caller, John Smith, and a second, call-waiting caller, Mary Wong. In this case, the caller-ID device re-displays the caller-ID information for the first caller in a summary form by shifting the name of the first caller to the first row of the display panel, and illuminates the sequence indicator 50 adjacent to the first row, thereby conveying to the user that the information in the first row corresponds to the first caller. The caller-ID device concurrently shows the complete caller-ID information for the call-waiting caller in the second, third and fourth rows of the display panel, and illuminates the sequence indicator 52 adjacent to the second row to indicate a "2", thereby indicating to the user that the information in the second row corresponds to the second caller. In the preferred embodiment of the present invention, the sequence indicator 52 adjacent to the second caller flashes to indicate that it is a call-waiting caller.

Figure 11:
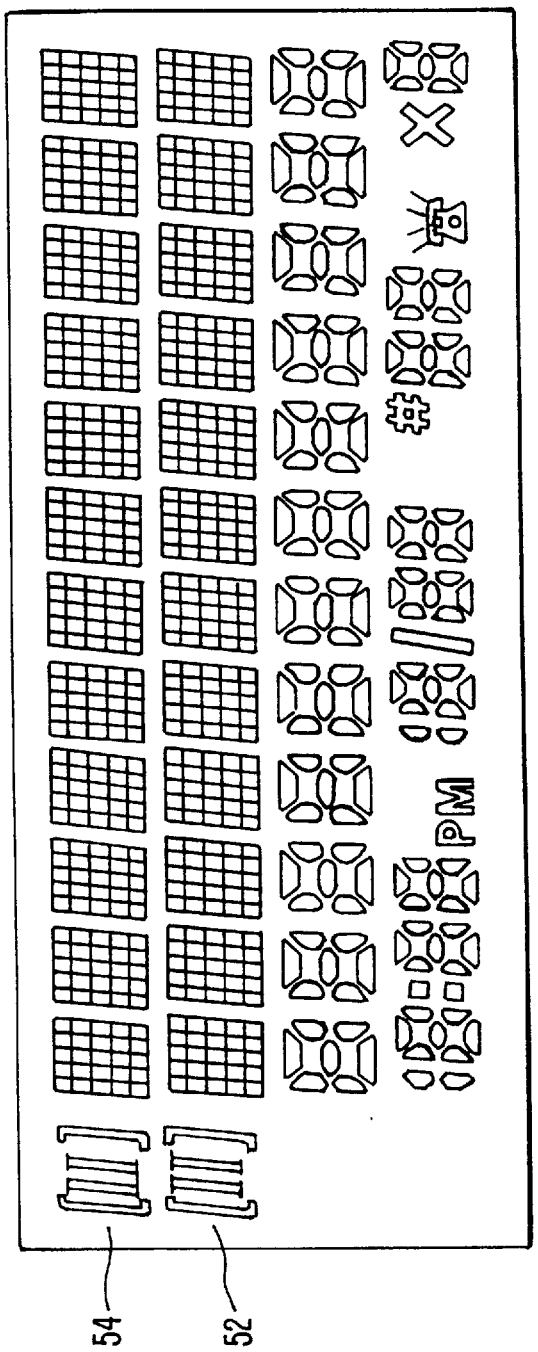
FIG. 11 is a representation of a third embodiment of a novel display panel according to the present invention.

Referring to FIG. 11, there is shown yet another embodiment of a display unit according to the present invention. Here, both of the sequence indicators 54 and 52 are variable to indicate either a "1" or a "2". In this case, when the user is engaged with the first caller, the caller-ID device shows the complete caller-ID information for the first caller in the second, third and fourth rows of the display panel, and the caller-ID device illuminates the sequence indicator 52 adjacent to the second row to indicate a "1". When the caller-ID device receives a call from a second call-waiting caller, it displays the caller-ID information of the second caller in summary form by, for example, displaying the name and/or phone number of the second caller in the first row of the display panel, and illuminates the sequence indicator 54 adjacent to the first row to indicate a "2".

Thereafter, when the user switches to the second caller, the caller-ID device re-displays the caller-ID information for the first caller in summary form by, for example, shifting the name and/or number of the first caller to the first row, and illuminates the sequence indicator 54 adjacent to the first row to indicate a "1". The caller-ID device then shows the complete caller-ID information for the second caller in the second, third and fourth rows, and illuminates the sequence indicator 52 adjacent to the second row to indicate a "2". In this manner, the complete caller-ID information for the caller with which the user is presently engaged is always shown in the display panel. In one embodiment of the present invention, the user switches between the first and second caller by pressing the "FLASH" button on the caller-ID device.

Figure 12:
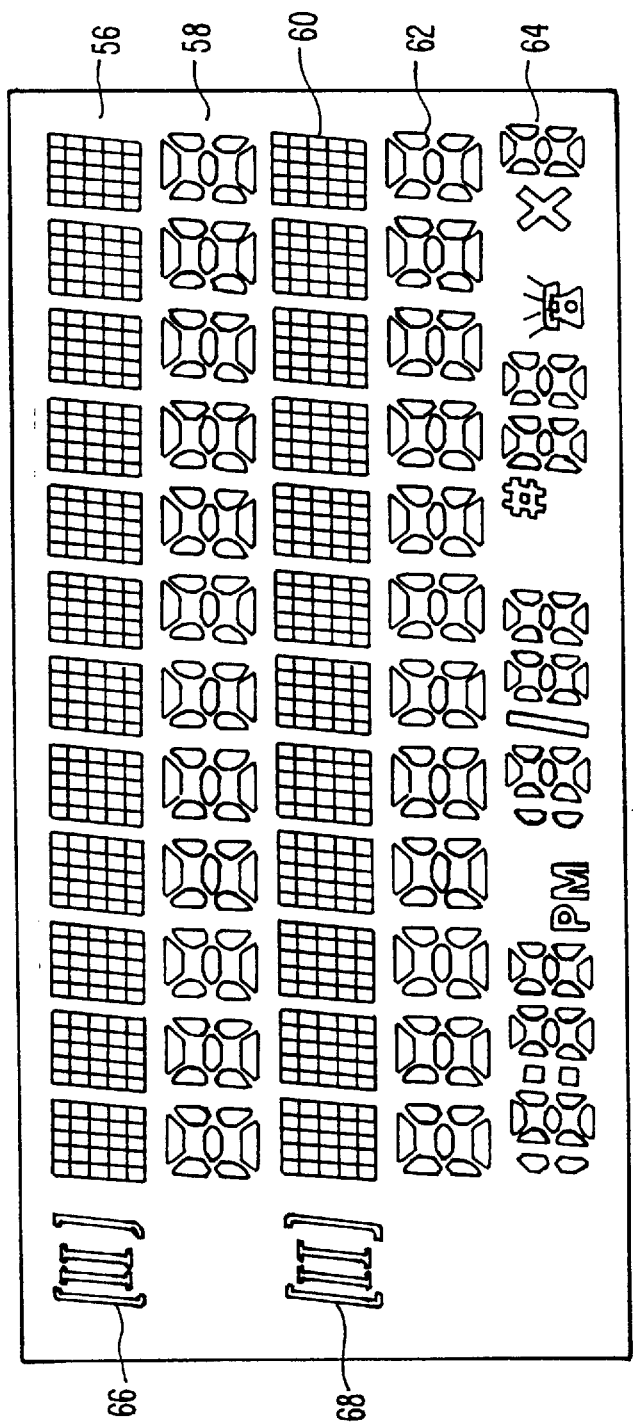
FIG. 12 is a representation of a fourth embodiment of a novel display panel according to the present invention.

Referring to FIG. 12, there is shown yet another embodiment of a display panel according to the present invention. It includes five rows/lines for the display of caller-ID information including (from top to bottom) a first row 56 for displaying the name of a first caller, a second row 58 for displaying the number of the first caller, a third row 60 for displaying the name of a second caller, a fourth row 62 for displaying the phone number of the second caller, and a fifth row 64 for displaying additional information related to the second caller including, but not limited to, the time and the date associated with a second call. In this embodiment, the summary form of the caller-ID information includes, for example, both the name and phone number of the specified caller. The display panel also includes sequence indicators, 66 and 68, which are both variable to display either a "1", or a "2".

Various alternate embodiments for the sequence indicators are encompassed by the present invention. For example, instead of being in the form of Roman numerals, each sequence indicator may be in the form of 7 light-emitting segments arranged in the typical "figure 8" configuration used for the display of numbers. Alternatively, the sequence indicator may be in the form of a matrix of light emitting elements.

Figure 13:
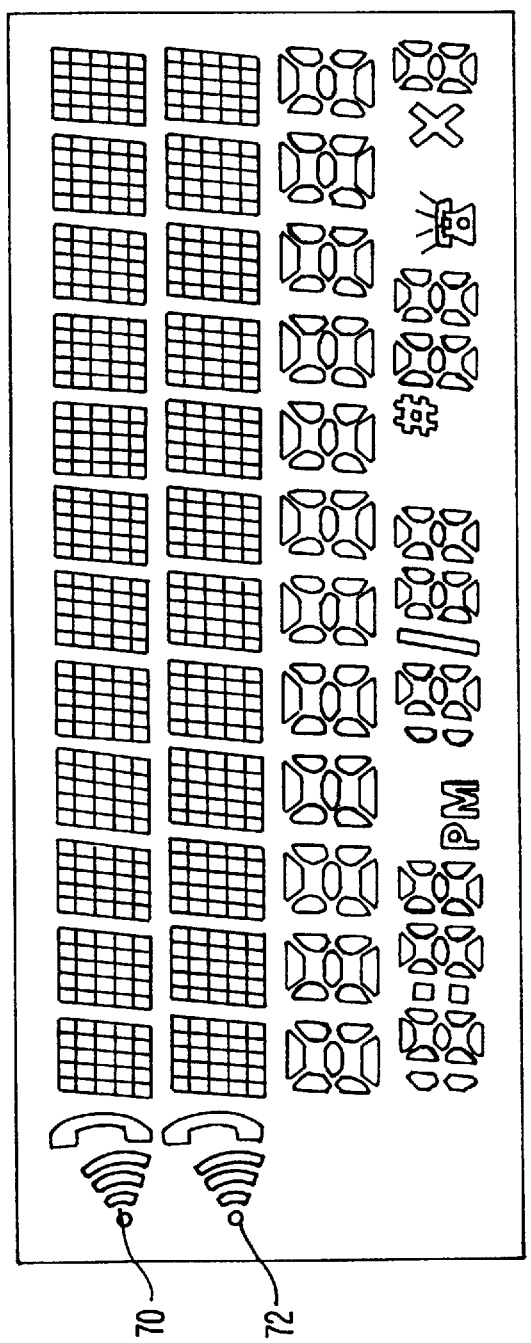
FIG. 13 is a representation of a fifth embodiment of a novel display panel according to the present invention.

When the user is talking to one caller and has another caller, a call-waiting caller, on hold, it would be desirable for the user quickly and efficiently determine the caller with whom he is presently talking. Referring to FIG. 13, there is shown an embodiment of the display panel of FIG. 11 where the sequence indicators 52 and 54 are replaced by the symbols 70 and 72. Each symbol includes LCD elements portraying a telephone handset with sound waves directed toward the mouthpiece portion. When the user is engaged with a certain caller, the caller-ID device flashes the LCD elements of the sound wave portion of the symbol adjacent to the engaged caller (i.e., the caller-ID information of the caller). Alternatively, the caller-ID device "animates" the sound wave by illuminating each LCD element of the sound wave portion of the symbol in sequence (to similate a "moving" sound wave). The symbol adjacent to the caller-ID information of the on-hold caller remains static, thereby indicating to the user that the corresponding caller is waiting.

Various alternate embodiments of symbols for indicating the caller with which the user is presently engaged are encompassed by the present invention. For example, instead of portraying a telephone handset and sound waves, the symbol can include LCD elements portraying both a closed mouth and an open mouth. In this case, when the user is engaged with a particular caller, the caller-ID device indicates a "talking" mouth adjacent to the engaged caller by alternately illuminating the LCDs portraying the open mouth and the LCDs portraying the closed mouth.

In another embodiment of the present invention, the symbols are replaced by LCD elements sufficient to spell out the words "TALK" and "WAIT". Hence, when the user is engaged with a particular caller, the caller ID device illuminates the word "TALK" adjacent to the caller-ID information for the engaged caller, and illuminates the word "WAIT" adjacent to the caller-ID information of the waiting caller.

E. Dialing Phone Numbers

The caller-ID device of the present invention is configurable to dial a phone number shown in display unit 20. As described above, data storage unit 18 includes a caller-ID memory area for storing caller-ID information including, but not limited to, a plurality of phone numbers. Typically, each phone number includes both the seven digit phone number and the area code of the caller. User interface 22 includes three dialing keys including a "7DIGITS" dialing key (not shown), a "AREA+7DIGITS" dialing key (not shown), and a "1+AREA+7DIGITS" dialing key (not shown). User interface 22 also includes dialing signal generation circuitry which generates a "7DIGITS" dialing control signal in response to the "7DIGITS" dialing key being activated, an "AREA+7DIGITS" dialing control signal in response to the "AREA+7DIGITS" dialing key being activated, and a "1+AREA+7DIGITS" dialing control signal in response to the "1+AREA+7DIGITS" dialing key being activated. Controller 16 is responsive to the various dialing control signals to operate dialing circuit 32 according to the particular dialing control signal received and the phone number selected from the caller-ID memory area of data storage unit 18.

Figure 14:
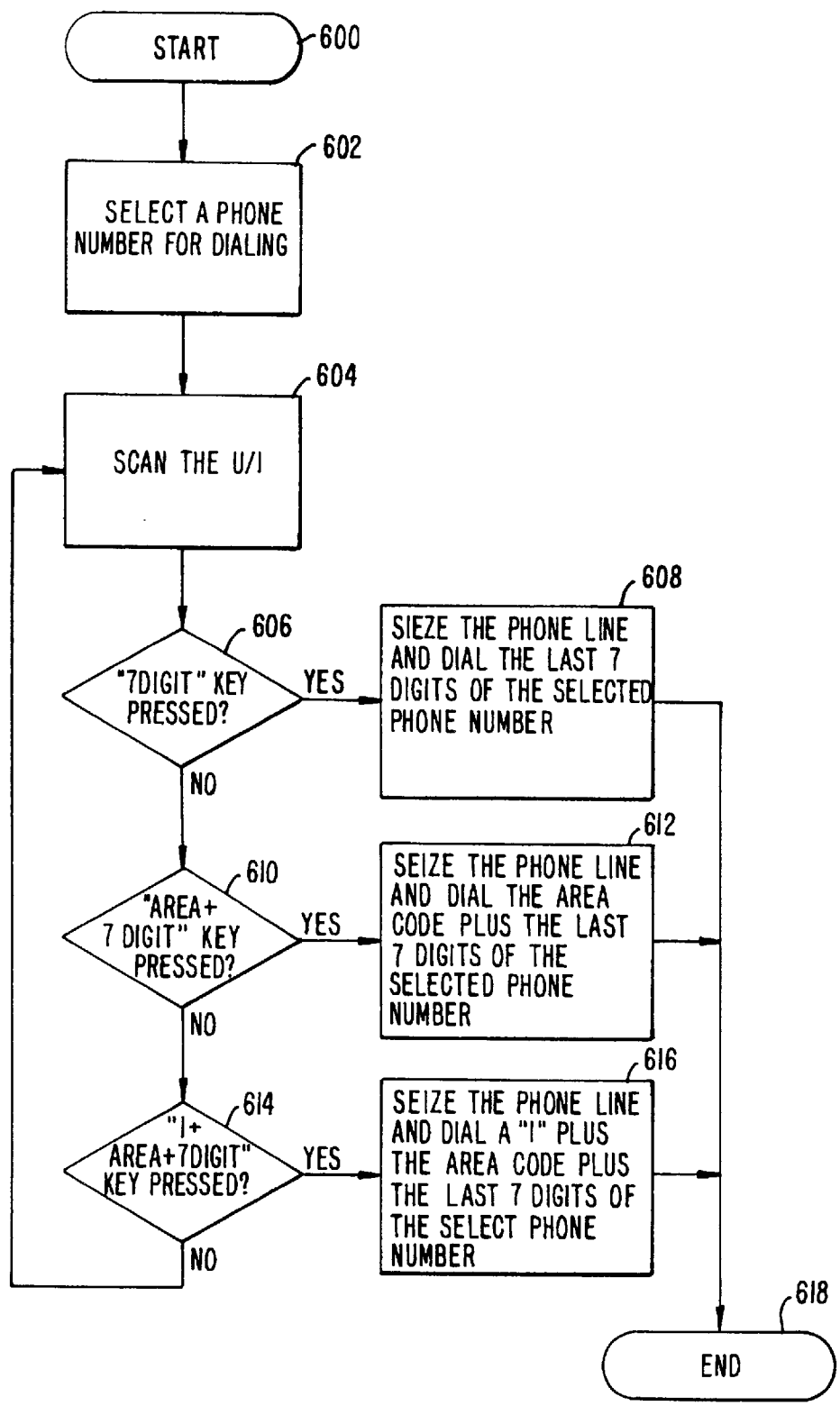
FIG. 14 is a flow-chart representation of a method for dialing a phone number in a caller-ID device according to the present invention.

FIG. 14 is a flow-chart representation of a method of dialing a phone number with the caller-ID device according to the present invention. A step 600 provides an entry point for the method. At a step 602, the user selects a phone number for dialing by, for example, activating the cue/review keys of the user interface 22 to review caller information stored in data storage unit 18.

When the desired phone number is shown in display unit 20, the user causes the caller-ID device to dial the selected phone number by pressing one of the three dialing keys (not shown) of user interface 22. At a step 604, the caller-ID device scans user interface 22 to determine whether a key has been pressed. When the caller-ID device determines at a step 606 that the user has pressed the "7DIGITS" dialing key, the caller-ID device, at a step 608, seizes the telephone line and dials the last seven digits of the selected phone number only. When caller-ID device determines at a step 610 that the user has pressed the "AREA+7DIGITS" dialing key, then the caller-ID device, at a step 612, seizes the telephone line and dials the area code and the last seven digits of the selected phone number. When the caller-ID device determines at a step 614 that the user has pressed the "1+AREA+7DIGITS" dialing key, then the caller-ID device, at a step 616 seizes the telephone line and dials a "1", the area code, and the last seven digits of the selected phone number. A step 618 provides an exit point for the method.

CONCLUSION

In conclusion, it is apparent that the present invention provides a convenient apparatus and method for dialing a selected phone number according to varied dialing requirements; a convenient and economical apparatus and method for simultaneously displaying the caller-ID information for a present caller and a call-waiting caller; and a convenient apparatus and method for processing caller-ID information.

While the above is a complete description of a preferred embodiment of the invention, various modifications, alternative constructions, and equivalents may be used. For example, it is not required that the complete caller-ID information be shown on the second, third and fourth rows of the display unit. The complete caller-ID information may be displayed on any combination of rows and/or lines of the display unit. Furthermore, the name and/or arrangement of keys in the user interface; the form and/or content of messages or alarms generated by caller-ID device; and the specific name and/or form of an instruction code appended to stored data are not critical and may vary. Accordingly, the above description should not be taken as limiting the scope of the invention as defined by the appended claims.

What is claimed is:

1. A caller-ID device comprising:
    a caller-ID receiver for receiving a phone number contained in a caller-ID signal;
    a data storage unit for storing a plurality of said phone numbers;
    a desired phone number selector coupled to said data storage unit for selecting a desired phone number from said plurality of phone numbers;
    a dialing circuit, coupled to said desired phone number selector and to a telephone line, said dialing circuit including
      a first dialing signal generator;
      a second dialing signal generator;
      a third dialing signal generator; and
      a dialer coupled to said first, second and third dialing signal generators and to said desired phone number selector for receiving said desired phone number and presenting said desired phone number on a display, said dialer responsive to said dialing signal generators to dial an out-going telephone number derived from said desired phone number;
    wherein said dialer is responsive to a first dialing signal to dial said out-going telephone number consisting of an exchange and an extension of said desired phone number;
    wherein said dialer is responsive to a second dialing signal to dial said out-going telephone number consisting of an area code, an exchange, and an extension of said desired phone number; and
    wherein said dialer is responsive to a third dialing signal to dial said out-going telephone number consisting of a long-distance code concatenated with an area code, an exchange, and an extension of said desired phone number.

2. The caller-ID device of claim 1, wherein said exchange and extension of said desired phone number correspond to the telephone number digits in a given number of successive places starting from the least significant place;
    wherein said area code of said desired telephone number corresponds to the telephone number digits in a given number of successive places starting from the most significant place; and
    wherein said long-distance code is a predetermined digit or sequence of digits.

3. The caller-ID device of claim 1, wherein said first, second, and third dialing signal generators are activated by the actualization of a first, second, and third push button, key or switch respectively to generate one of said dialing signals correspondingly.

4. A method for dialing an out-going telephone number derived from a telephone number received from a caller-ID signal, comprising the steps of:
    retrieving a desired telephone number from a memory storing a caller-ID telephone number transmitted over a telephone line;
    presenting said desired telephone number on a display, said desired telephone number having an area code, an exchange, and an extension; thereafter
    creating an out-going telephone number in response to selection of one of three actuators, wherein selection of a first actuator creates said out-going telephone number consisting of said exchange and said extension, wherein selection of a second actuator creates said out-going telephone number consisting of said area code, said exchange, and said extension, and wherein selection of a third actuator creates said out-going telephone number consisting of a long distance code concatenated with said area code, said exchange, and said extension; and thereafter
    dialing said out-going telephone number.

* * * * *